(12) United States Patent
Starbuck et al.

(10) Patent No.: US 7,533,149 B2
(45) Date of Patent: May 12, 2009

(54) MAINTAINING MULTIPLE VERSIONS OF MESSAGE BODIES IN A COMMON DATABASE

(75) Inventors: Bryan T. Starbuck, Redmond, WA (US); Gail Borod Giacobbe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

(21) Appl. No.: 10/835,822

(22) Filed: Apr. 30, 2004

(65) Prior Publication Data

US 2005/0246423 A1 Nov. 3, 2005

(51) Int. Cl.
*G06F 15/16* (2006.01)

(52) U.S. Cl. ............... 709/206; 709/207; 379/67.1; 379/68; 379/88.13; 379/88.17; 379/88.22; 379/900; 379/908

(58) Field of Classification Search .......... 709/206–207
See application file for complete search history.

(56) References Cited

U.S. PATENT DOCUMENTS

| | | | |
|---|---|---|---|
| 5,781,901 A | 7/1998 | Kuzma | |
| 5,794,039 A | 8/1998 | Guck | |
| 6,324,569 B1 | 11/2001 | Ogilvie | |
| 6,430,174 B1 | 8/2002 | Jennings | |
| 6,430,177 B1 | 8/2002 | Luzeski | |
| 6,457,030 B1* | 9/2002 | Adams et al. | 715/239 |
| 6,487,278 B1 | 11/2002 | Skladman | |
| 6,493,703 B1 | 12/2002 | Knight et al. | 707/3 |
| 6,549,612 B2* | 4/2003 | Gifford et al. | 379/67.1 |
| 6,738,800 B1* | 5/2004 | Aquilon et al. | 709/206 |
| 6,778,642 B1 | 8/2004 | Schmidt | |
| 6,850,228 B1* | 2/2005 | Parks et al. | 345/173 |
| 6,990,513 B2 | 1/2006 | Belfiore | |
| 7,116,766 B2* | 10/2006 | Owens et al. | 379/93.24 |
| 7,119,918 B2* | 10/2006 | Toyoda et al. | 358/1.15 |
| 7,171,432 B2* | 1/2007 | Wildhagen et al. | 707/203 |
| 7,263,698 B2* | 8/2007 | Wildhagen et al. | 717/170 |
| 2002/0013817 A1 | 1/2002 | Collins | |
| 2002/0178353 A1* | 11/2002 | Graham | 713/151 |
| 2003/0018644 A1 | 1/2003 | Bala et al. | 707/100 |

(Continued)

OTHER PUBLICATIONS

Office Action mailed Feb. 6, 2008 cited in U.S. Appl. No. 10/693,547.

(Continued)

*Primary Examiner*—John Follansbee
*Assistant Examiner*—Saket K Daftuar
(74) *Attorney, Agent, or Firm*—Workman Nydegger (57) ABSTRACT

The present invention extends to methods, systems, computer program products, and data structures for maintaining multiple versions of electronic bodies in a common database. A computer system maintains an association between an electronic message and a plurality of versions of a corresponding message body in a database that is accessible to a plurality of messaging applications. Versions of the corresponding message body can be stored in different formats that vary in fidelity. A messaging application submits a request to access an electronic message. An operating system receives the request and identifies data formats supported by the messaging application. The operating system provides the messaging application with an appropriate version of the message body from the database based on the supported data formats. The messaging application receives the version of the message body and utilizes the version of the message body to perform a message related operation.

24 Claims, 4 Drawing Sheets

U.S. PATENT DOCUMENTS

| | | | |
|---|---|---|---|
| 2003/0018721 A1 | 1/2003 | Gupta | |
| 2003/0041095 A1* | 2/2003 | Konda et al. | 709/201 |
| 2003/0088704 A1* | 5/2003 | Mertama et al. | 709/246 |
| 2003/0093565 A1 | 5/2003 | Berger | |
| 2003/0105712 A1* | 6/2003 | Bodensohn | 705/40 |
| 2004/0044703 A1* | 3/2004 | Wildhagen et al. | 707/203 |
| 2004/0044998 A1* | 3/2004 | Wildhagen et al. | 717/170 |
| 2004/0109197 A1* | 6/2004 | Gardaz et al. | 358/1.15 |
| 2004/0111302 A1 | 6/2004 | Falk | |
| 2004/0133646 A1* | 7/2004 | Leukert-Knapp et al. | 709/206 |
| 2004/0143569 A1 | 7/2004 | Gross | |
| 2004/0181467 A1* | 9/2004 | Raiyani et al. | 705/28 |
| 2004/0203664 A1 | 10/2004 | Lei | |
| 2004/0205644 A1* | 10/2004 | Shaughnessy et al. | 715/530 |
| 2004/0229595 A1* | 11/2004 | Laursen et al. | 455/403 |
| 2004/0237042 A1 | 11/2004 | Murray et al. | 715/530 |
| 2004/0243926 A1* | 12/2004 | Trenbeath et al. | 715/501.1 |
| 2005/0033811 A1* | 2/2005 | Bhogal et al. | 709/206 |
| 2005/0033813 A1* | 2/2005 | Bhogal et al. | 709/206 |
| 2005/0060317 A1 | 3/2005 | Lott et al. | 707/10 |
| 2005/0108332 A1 | 5/2005 | Vaschillo | |
| 2006/0089931 A1 | 4/2006 | Giacobbe | |
| 2007/0208802 A1* | 9/2007 | Barman et al. | 709/203 |

OTHER PUBLICATIONS

Zhuoqing, M.M., Katz R., *Achieving Service Portability Using Self-Adaptive Data Paths*, California University, Berkeley, C.A., Jan. 2002.

Ramon, B., Katz, R.H., Joseph, A.D., *University Inbox: Providing Extensible Personal Mobility And Service Mobility In An Integrated Communication Network*, Div. of Comput. Sci., California University, Berkeley, C.A., 2000.

U.S. Appl. No. 10/692,201, filed Oct. 23, 2003, Giacobbe, et al.

U.S. Appl. No. 10/971,403, filed Oct. 22, 2004, Giacobbe, et al.

U.S. Appl. No. 10/693,547, filed Oct. 23, 2003, Winjum, et al.

Thurston, M.G., An Open Standard for Web-Based Condition-Based Maintenance Systems, IEEE 2001, Appl. Res. lab., Pennslyvania State Univ., University park, PA.

Greg Elsenhauer, Karsten Schwan, Patrick Widner, Open Metadata Formats: Efficient XML-Based Communication for Heterogneous Distributed Systems, College of Computing, Georgia Institute of Technology, Atlanta GA 30332-0280, IEEE 2001.

Office Action dated May 22, 2008 cited in related U.S. Appl. No. 10/971,403 (Copy Attached).

Notice of Allowance dated Oct. 11, 2006 cited in related U.S. Appl. No. 10/692,201 (Copy Attached).

Notice of Allowance dated Jun. 13, 2008 cited in related U.S. Appl. No. 10/693,547 (Copy Attached).

Office Action mailed Aug. 2, 2007 in related U.S. Appl. No. 10/693,547.

Office Action mailed Jun. 27, 2007 in related U.S. Appl. No. 10/971,403.

* cited by examiner

MAINTAINING MULTIPLE VERSIONS OF MESSAGE BODIES IN A COMMON DATABASE

BACKGROUND OF THE INVENTION

1. The Field of the Invention

The present invention relates to electronic messaging and, more particularly, to maintaining multiple versions of message bodies in a common database

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

In particular, electronic messaging has become an important method for communicating. Computer system users often send and receive electronic messages (e.g., electronic mail messages, instant messages, faxes, news group postings, etc.) to exchange information with one another. For example, to create an electronic mail message, a sending user typically selects a new message option from within an electronic mail application. In response to the selection, the electronic mail application displays one or more fields (e.g., a To field, a Body field, etc.) that can receive user entered data. The sending user then enters data (e.g., at a keyboard) into the displayed fields. When appropriate, the sending user can save the electronic mail message as a draft or send the electronic mail message to a recipient user (e.g., by selecting the appropnate "save" or "send" control within the electronic mail application).

Sending the electronic mail message may cause the electronic mail message to be routed from the sending user's computer system, through a sending mail server, across a network, to a receiving mail server that stores electronic mail messages for a recipient user. To view the electronic mail message, the recipient user establishes a connection from an electronic mail application to the receiving mail server. Establishing the connection can cause all electronic mail messages sent to the recipient user, including the mail message from the sending user, to be transferred from the receiving mail server to the recipient user's computer system and stored at the recipient user's computer system. After the electronic mail message from the sending user is transferred and stored, the recipient user may manipulate an input device, such as, for example, a mouse, within the electronic mail application to view the stored electronic mail message.

Computer system users can also use other different messaging applications to send, receive, and store other different types of electronic messages. Unfortunately, different types of electronic messages (e.g., electronic mail messages, instant messages, faxes, blog entries, voice messages, etc.) are typically stored in different, and often application specific, message data formats. For example, one type of electronic message (e.g., an electronic mail message) may be stored in a first message data format (e.g., Rich Text Format ("RTF")), while another type of electronic message (e.g., an instant message) is stored in a second different message data format (e.g., eXtensible Markup Language "XML"). Processing a particular electronic message typically requires a messaging application that is configured to process message data of a particular corresponding message data format For example, a user is typically required to use an instant messaging application to process electronic messages in an instant message data format, required to use an electronic mail application to process electronic messages in an electronic mail message data format, required to use a fax application to process electronic messages in a fax message data format, etc.

Further, it is essentially impracticable to design a messaging application to be compatible with message data formats used by a variety of other messaging applications. For example, it would require $10^2$ (100) pieces of custom code to design ten messaging applications having different message data formats to be compatible with one another's message data formats. Also, for continued compatibility, each existing messaging application would have to be updated with new custom code as new message data formats evolve.

Accordingly, messaging applications are typically designed for compatibility with only a few, or even only one, message data format and cannot generally be used to access electronic messages of other message data formats. That is, messaging applications are typically designed to access message data stored in a limited number of message data formats, and potentially only one message data format, that correspond to a specified message type. For example, an instant message application is typically configured to access data stored in an instant message data format but is typically not configured to access data stored in a fax or electronic mail message data format. Thus, it would be difficult, if not impossible, to use an instant messaging application to view messages stored in a fax or electronic mail message data format.

Additionally, as previously mentioned, some message data formats are application specific. Thus, two messaging applications configured to process the same type of electronic messages (e.g., electronic mail messages) may nonetheless use different message data formats to store electronic message data. For example, a first electronic mail application may store electronic mail messages using a first message data format, while a second electronic mail application stores electronic mail messages using a second different message data format. Thus, a messaging application developed to access electronic messages of a particular type may not be able to access all electronic messages of a particular type. For example, an electronic mail message stored in the first message data format by the first electronic mail application may not be accessible to the second electronic mail application (e.g., that can only access electronic mail messages stored in the second message data format).

At least one attempt has been made to compensate for different message data formats. For example, the Multipurpose Internet Message Extension ("MIME") Standard defines a multi-part alternate format that facilitates including multiple versions of (the same) message data in an electronic message. Each version of the message data is in a different message data format. Including multiple differently formatted versions of message data increases the likelihood that a receiving messaging application will be able to process the message data. For example, a sending electronic mail application can include both a HyperText Markup Language ("HTML") version and a plain text version of message data in an electronic mail message. Thus, receiving electronic mail applications capable of processing HTML can process the HTML version of the message data and receiving electronic mail applications capable of processing plain text can process the plain text version of the message data.

Unfortunately, it would be very difficult, if not impossible, to utilize multi-part messages to account for every possible message data format. The size of the electronic messages would become quite large and would unnecessarily consume network resources when transferred. Further, large portions of multi-part messages would never be processed, since a receiving messaging application could process, at most, only a few of the different message data formats included in the message.

Further, different messaging applications typically storing corresponding electronic messages in different databases. For example, instant messaging applications typically store instant messages in an instant messaging database, electronic mail applications typically store electronic mail messages in an electronic mail database, a news group reader typically stores news group postings in a news group database, etc. Thus, even if first messaging application was configured to process a message data format commonly associated with second messaging application, the first message application would typically have no way to the location of the second messaging application's database.

Accordingly, most, if not all, computer systems include a number of messaging applications for storing and accessing message data stored in different message data formats and residing in different databases. Rarely, if ever, is one messaging application design to access the message database of another messaging application. Thus, a user may be required to use a number of messaging applications. For example, a computer system often includes an electronic mail application for processing electronic mail messages, an instant message application for processing instant messages, and a fax application for processing fax messages, etc.

Using multiple electronic messaging applications can be time consuming, for example, when a user desires to access all available electronic messages corresponding having specified content. If the desired electronic messages are stored in different data formats and/or reside in different databases, each messaging application will have to perform a separate search for desired electronic messages. For example, the user may be required to switch to an electronic mail application (or even switch between multiple electronic mail applications) to search for electronic mail messages, switch to an instant message application to search for instant messages, and switch to a voice message application to search for voice messages. Having multiple messaging applications perform searches for electronic messages potentially results in an undesirable expenditure of time and computer system resources. Therefore systems, methods, computer program products, and data structures that facilitate more efficient access to the electronic message data would be advantageous.

BRIEF SUMMARY OF THE INVENTION

The foregoing problems with the prior state of the art are overcome by the principles of the present invention, which are directed towards methods, systems, computer program products, and data structures for maintaining multiple versions of electronic bodies in a common database. A computer system maintains an association between an electronic message and a plurality of versions of a corresponding message body. The electronic message and the versions of the corresponding message body being are stored in a database that is accessible to a plurality of messaging applications. At least one higher fidelity version of the message body is maintained in accordance with a higher fidelity data format and at least one lower fidelity version of the message body is maintained in accordance with a lower fidelity data format.

A messaging application submits a request to access an electronic message. An operating system receives the messaging application request and identifies data formats supported by the messaging application. The operating system provides the messaging application with an appropriate version of the message body from the database based on the supported data formats. The messaging application receives the version of the message body and utilizes the version of the message body to perform a message related operation.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide for maintaining multiple versions of electronic bodies in a common database. A computer system maintains an association between an electronic message and a plurality of versions of a corresponding message body. The electronic message and the versions of the corresponding message body are stored in a database that is accessible to a plurality of messaging applications. At least one higher fidelity version of the message body is maintained in accordance with a higher fidelity data format and at least one lower fidelity version of the message body is maintained in accordance with a lower fidelity data format.

A messaging application submits a request to access an electronic message. An operating system receives the messaging application request and identifies data formats supported by the messaging application. The operating system provides the messaging application with an appropriate version of the message body from the database based on the supported data formats. The messaging application receives the version of the message body and utilizes the version of the message body to perform a message related operation.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "schema" is defined as an expression of a shared vocabulary between a plurality of computer systems that allows the plurality of computer systems to process documents according to the expressed shared vocabulary. For example, an eXtensible Markup Language ("XML") schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actual file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. Some examples of user-defined data types are DateTime data types representing date and time data and EAddress data types representing electronic addresses data, such as, for example, telephone numbers, electronic mail address, instant message addresses, etc. A schema a can also be defined to reference or link to other schemas in a schema hierarchy.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
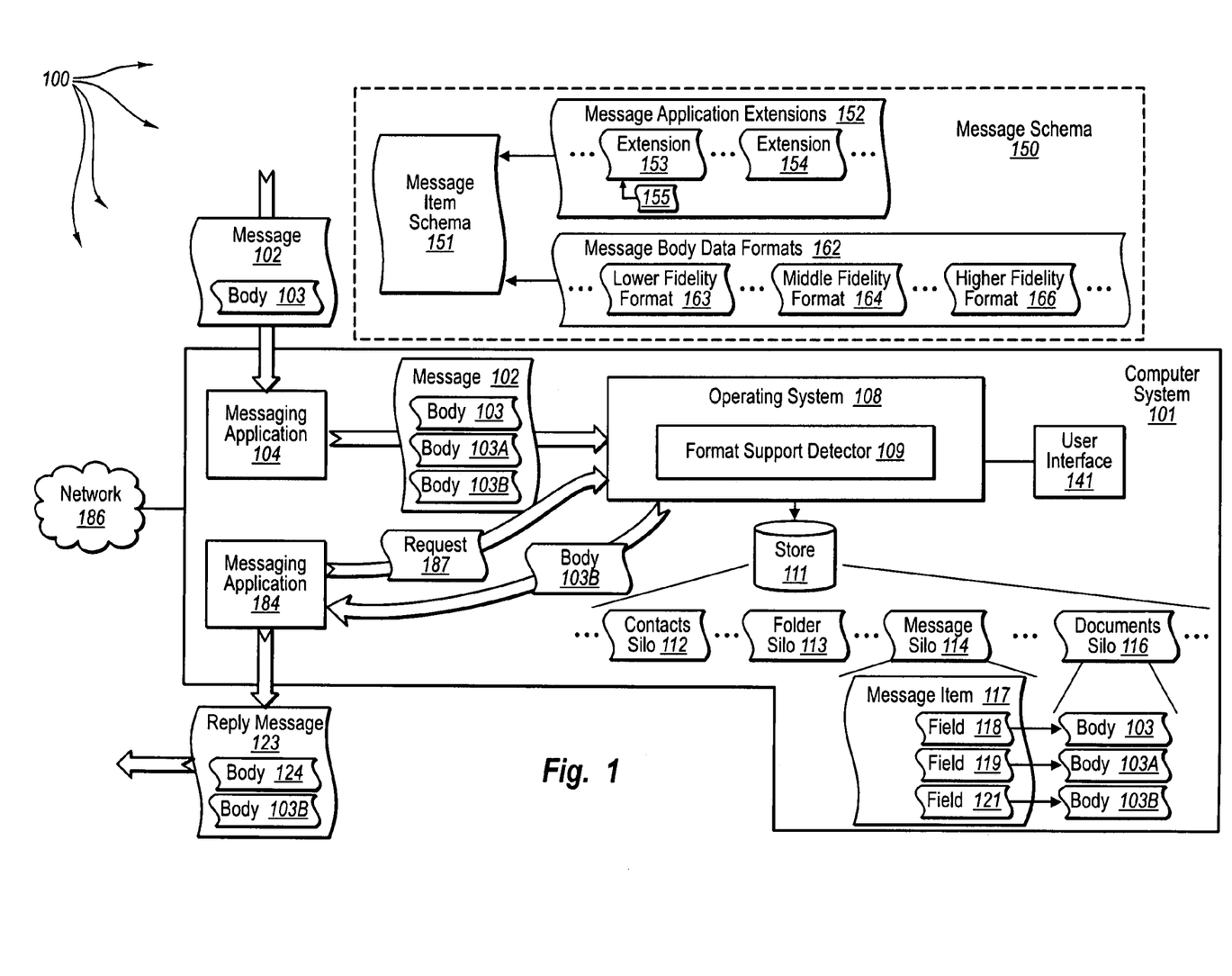
FIG. 1 illustrates an example of a computer architecture that facilitates maintaining multiple versions of message bodies in a common database.

FIG. 1 illustrates an example of a computer architecture 100 that facilitates maintaining multiple versions of message bodies in a common database. Computer architecture 100 includes computer system 101 and message schema 151 that facilitate maintaining multiple versions of message bodies in a common database in accordance with the principles of the present invention. Computer system 101 includes messaging applications 104 and 184 that may be any of a variety of message applications, such as, for example, electronic mail applications, instant message applications, fax applications, news group applications, blog applications, Short Message Service ("SMS") applications, etc.

Operating system 108 can interoperate with message applications 104 and 184, as well as user interface 141 to maintain multiple versions of message bodies in store 111. User interface 141 can present message related data, including message bodies, to a user such that the user can perform message related operations on the presented message related data. Format support detector 109 can detect the data formats that are supported by a messaging application. Based on data formats supported by a messaging application, operating system 108 can provide an appropriate version of a message body to a requesting messaging application.

Computer system 101 is connected to network 186. Network 186 can be a Local Area Network ("LAN"), Wide Area Network ("WAN"), or even the Internet. Computer system 101 can receive data from and send data to other computer systems connected to network 186. Further, other computer systems connected to network 186 may have access to message schema 150. Accordingly, computer system 101 and other computer systems can exchange message related data (e.g., electronic mail messages, instant messages, fax messages, news group postings, voice messages, message attachments, SMS messages, etc.) in accordance with schema 150 via network 186.

Store 111 can be a database that stores a plurality of different types of database items. For example, contacts silo 112 can store contact items representing contacts (e.g., individuals, organizations, corporations, etc.), folder silo 113 can store folder items representing folders that store other types of items (e.g., that store message items), message silo 114 can store message items representing electronic messages, document silo 116 can store document items representing various types of documents, etc. Message items stored in store 111 can include data fields defined in accordance with the message schema 150. A series of three periods (an ellipsis) before contacts silo 112, between other silos, and after document silo 116 indicates that other silos (potentially storing other different types of items) can be included in store 111. Store 111 is accessible to messaging applications, such as, for example, messaging applications 104 and 184, at computer system 101.

Message items representing electronic messages (as well as other types of items in store 111) can be defined in accordance with a base item schema. Generally, a base item schema can define data formats for data fields (e.g., a globally unique ID and display name) used to differentiate one database item from another database item. Accordingly, message items stored in message silo 114 (as well as items stored contacts silo 112, folder silo 113, and document silo 116) can include one or more data fields defined in accordance with a base item schema.

Generally, message schema 150 includes a message item schema 151, message extensions (e.g., message application extensions 152), and message body formats 162. Message schema item 150 defines data formats for one or more data fields (e.g., message subject, message size, etc.) that are common to a plurality of different types of electronic messages, such as, for example, electronic mail messages, instant messages, news group postings, blog entries, fax messages, voice mail messages, etc. Different types of electronic messages also include saved portions of real-time conversations, such as, for example, a saved instant message log, a saved recording of a telephone conversation, a saved recording of a video conference, etc. Further, a message item 151 defined in accordance with message schema 150 can also include data fields defined in accordance with one or more message extensions schemas.

Some message extension schemas can be protocol extensions that promote compatibility with specified message protocols. Message protocol extension schemas can contain data fields that are specific to particular message protocols. For example, a first protocol extension schema can define data formats for one or more data fields specific to a first message protocol (e.g., Network News Transfer Protocol ("NTTP")) and a second protocol extension schema can define data formats for one or more data fields specific to a second message protocol (e.g., Post Office Protocol ("POP")). Protocol extension schemas can be arranged hierarchy. For example, a protocol extension schema can define data formats for additional data fields specific to a particular implementation of the first message protocol (having data fields defined in accordance with the first protocol extension schema).

Other message extensions can be application extensions that promote compatibility with specified message applications. For example, message application extension schemas 152 can contain one or more message application extension schemas defining data fields that are specific to message applications. For example, application extension schema 153 can define data formats for one or more data fields specific to a first message application (e.g., an electronic mail application) and application extension protocol schema 154 can define data formats for one or more data fields specific to a second message application (e.g., fax application). Application extension schemas can be arranged hierarchy. For example, application extension schema 155 can define data formats for additional data fields specific to a particular version of the first message application (having data fields defined in accordance with application extension schema 153).

Message schema 150 can also define one or more data fields that refer or link to contact related information (having data fields defined in accordance with a contact schema) in contacts silo 112. Accordingly, a message item defined in accordance with message schema 150 can refer or link to contacts related information in silo 112. Referring to or linking to contact related information can indicate that the entity corresponding to the contact related information is associated with the message item. Similarly, message schema 150 can define one or more data fields that refer or link to a folder related information (having data fields defined in accordance with a folder schema) in folders silo 113. Accordingly, a message item defined in accordance with message schema 150 can also refer or link to folder related information in folder silo 113. Referring to or linking to folder related information can indicate that the message item is stored in a folder corresponding to the folder related data.

Likewise, message schema 150 can define one or more data fields that refer to link to document related information in document silo 116. Accordingly, a message item defined in accordance with message schema 150 can also refer or link to documents in documents silo 116. Message bodies can be stored as documents in documents silo 116. Thus, a message item stored in message silo 114 can refer or link to one or more message bodies stored in documents silo 116. For example, fields 118, 119, and 121 can include data representing corresponding links to bodies 103, 103A, and 103B respectively.

Thus, a message item having data fields defined in accordance with message schema 150 can also have additional data fields defined in accordance with other message protocol and/or message applications extension schemas. Data fields corresponding to message extensions can be "snapped" on to and removed from message items as appropriate to facilitate compatibility with existing message protocols and message applications. Accordingly, the configuration of data fields contained in a message item can change over time.

Message body data formats 162 define data formats that can be utilized to store versions of message bodies. Some message body data formats can be lower fidelity data formats (e.g., lower fidelity format 163). Lower fidelity data formats can be associated with fewer features as compared to other message body data formats. For example, plain text format can be viewed as having fewer features than HyperText Markup Language ("HTML") format. Other message body data formats can be higher fidelity data formats. Higher fidelity data formats can be associated with more features as compared to other message body data formats. For example, an extensible Markup Language ("XML") format can be viewed as having more features than plain text format. Yet other message body data formats can be middle fidelity data formats (e.g., middle fidelity data format 164) that have fewer features than some message body data formats and more features than other message body data formats.

Some message body data formats, such as, for example, plain text format, may have more widespread compatibility across a plurality of different messaging applications. Other data formats, such as, for example, Tagged Image File Format Fax ("TIFF-F"), may have less widespread compatibility and may be limited to specific message applications, such as, for example, a fax messaging application. In some embodiments, higher fidelity data formats have less widespread compatibility, while lower fidelity data formats have more widespread compatibility. That is, while a reduced number of messaging applications may be configured to process Rich Text Format ("RTF") data, an increased number of messaging applications may be configured to process plain text data or HTML data.

Accordingly, there may be some trade off between the general level of compatibility and the features associated with a particular data format. For example, plain text may have widespread compatibility but have fewer features. On the other hand, an instant messaging proprietary data format may have limited compatibility but have more features.

Messaging applications can support a plurality of message body data formats across a range of fidelities. For example, some electronic mail applications are configured to process RTF, HTML, and plain text formats. Some Blog applications are configured to process XML and plain text formats. Thus, while higher fidelity data formats associated with messaging applications may not correspond (e.g., RTF and XML), one or more lower fidelity data formats associated the messaging applications may correspond (e.g., plain text).

Message body data formats 162 may define that message bodies are to be stored in accordance with one or more message body data formats (e.g., plain text and HTML) that have an increased likelihood of compatibility across a range of different messaging applications (but that may have fewer features). Message body data formats 162 may also define that message bodies are to be stored in one or more reduced compatibility, application specific or proprietary message body data formats that have a reduced likelihood of compatibility across a range of different messaging applications (but that may have more features). Accordingly, when an electronic message is received at a messaging application, operating system 108 can facilitate generation of (e.g., through appropriate commands to the messaging application) one or more versions of the message body in accordance with one or more corresponding data formats included in message body data formats 162. For example, format support detector 109 may detect that messaging application 104 supports RTF, HTML, and plain text formats. Accordingly, operating system 108 can facilitate the storage of RTF, HTML, and plain text versions of a message body received at message application 104.

Figure 2:
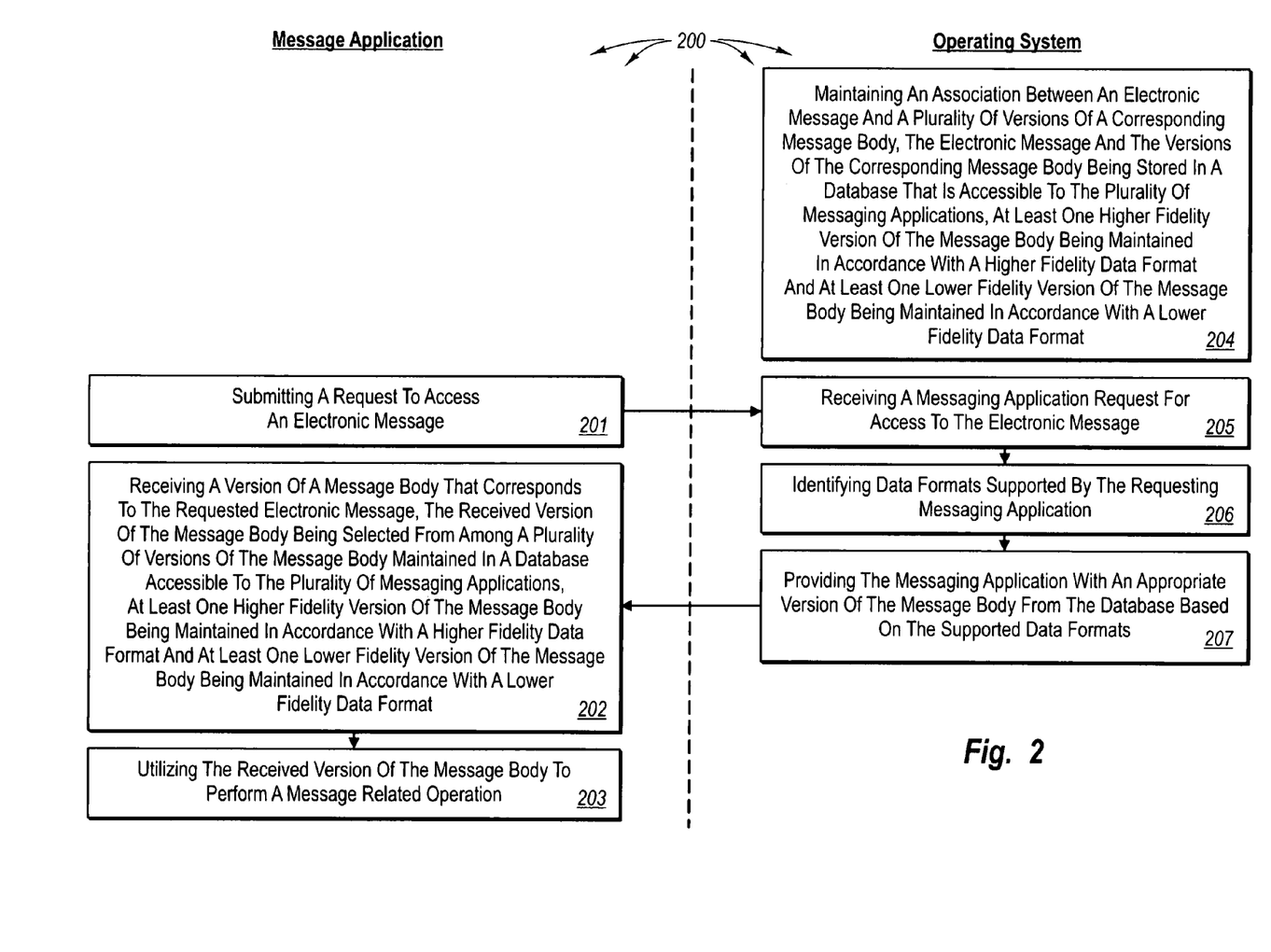
FIG. 2 illustrates an example flowchart of a method for providing access to an appropriate version of a message body.

FIG. 2 illustrates an example flowchart of a method 200 for providing access to an appropriate version of a message body. The method 200 will be described with respect to the components and data depicted in computer architecture 100. The method 200 includes an act of maintaining an association between an electronic message and a plurality of versions of a corresponding message body wherein the electronic message and the versions of the corresponding message body are stored in a database that is accessible to a plurality of messaging applications (act 204). At least one higher fidelity version of the message body is maintained in accordance with a higher fidelity data format and at least one lower fidelity version of the message body is maintained in accordance with a lower fidelity data format.

For example, messaging application 104 can receive message 102. Message 102 can include body version 103 that is in a higher fidelity data format specific to messaging application 104 (e.g., a proprietary instant message format). Format support detector 109 can detect that messaging application 104 is configured to process message body data in the proprietary data format, HTML format, and plain text format. Accordingly, operating system 108 and message application 104 can interoperate to produce additional body versions 103A and 103B. For example, body versions 103A and 103B can be HTML and plain text representations of body version 103 respectively.

In accordance with message schema 150, operating system 108 can store message 102 in store 111. For example, operating system 108 can store message item 117 in message silo 114 and body versions 103, 103A, and 103B in documents silo 116. Message item 117 includes fields 118, 119, and 121 that can include link data representing a link or reference to body versions 103, 103A, and 103B respectively. Accordingly, as depicted in FIG. 1, three versions (e.g., proprietary format, HTML format and plain text format) of message body 103 are maintained in store 111.

Embodiments of the present invention can work in combination with mechanisms for transferring a message having multiple body versions, such as, for example, the Multipurpose Internet Message Extension ("MIME") Standard multipart alternate format. Since each body version in such a message is potentially already in a different message body data format, operating system 108 can retrieve any appropriate body versions from the message and store the appropriate body versions in store 111. Storing the retrieved body versions in store 111 makes the body versions accessible to other messaging applications. Further, retrieving previously formatted body versions is potentially more resource efficient than having to produce additional body versions.

The method 200 includes an act of submitting a request to access an electronic message (act 201). For example, messaging application 184 can submit request 187 to operating system 108. Request 187 can result form user-input received at user interface 141. For example, a user of computer system 101 may enter a command to reply to a received message or query message related data in store 111. For example, a user can query message bodies for specified content. A query can be configured to query body versions in data formats that have more widespread compatibility (e.g., plain text).

The method 200 includes an act of receiving a messaging application request for access to the electronic message (act 205). For example, operating system 108 can receive request 187 from messaging application 184. Messaging application 184 can be a different type of message application than messaging application 104. For example, message application 184 may be an electronic mail application, while messaging application 104 is an instant messaging application. Accordingly, messaging application 184 and messaging application 104 may be configured to process different higher fidelity data formats.

The method 200 includes an act of identifying data formats supported by the requesting messaging application (act 206). For example, format support detector 109 can detect message body data formats (e.g., RTF format, HTML format, and plain text format) that messaging application 184 is configured to process. The method 200 includes an act of providing the messaging application with an appropriate version of the message body from the database based on the supported data formats (act 207). For example, operating system 108 can compare the message body data formats of body versions 103, 103A, and 103B to the message body data formats supported by messaging application 184. Based on the comparison, operating system 108 can provide an appropriate body version to messaging application 184.

It may be that an appropriate body version is the stored body version having the highest fidelity data format that is supported by messaging application 184. For example, if body versions 103, 103A, and 103B represented TIFF-F, HTML, and plain text versions respectively and messaging application 184 was configured to process RTF, HTML, and plain text, the HTML version can be provided to messaging application 184. However, providing the body version having the highest supported fidelity format is optional. Other versions can also be provided. For example, a plain text version can be provided to messaging application 184 as appropriate.

A messaging application can have a preferred message body data format or a hierarchy of preferred message body data formats. For example, an electronic mail program may have RTF format as a first preferred message body data format and HTML as a second preferred message body data format. Thus, if a message item has a corresponding RTF body version, the RTF body version can be provided to a messaging application, even when other body versions are stored (e.g., HTML and plain text). If the message item has a corresponding HTML body version, but not an RTF body version, the HTML body version can be provided to the messaging application, even when other body versions are stored (e.g., plain text). If preferred message body data formats are not available, any compatible body version can be provided to a requesting messaging application.

The method 200 includes an act of receiving a version of a message body that corresponds to the requested electronic message wherein the received version of the message body was selected from among a plurality of versions of the message body maintained in a database accessible to the plurality of messaging applications (act 202). As previously described, at least one higher fidelity version of the message body is maintained in accordance with a higher fidelity data format and at least one lower fidelity version of the message body is maintained in accordance with a lower fidelity data format. Thus, it may be, for example, that messaging application 184 receives body version 103B. Body version 103B can be selected from among body versions 103 (higher fidelity format), 103A middle fidelity format), and 103B (lower fidelity format).

The method 200 includes an act of utilizing the received version of the message body to perform a message related operation (act 203). For example, messaging application 184 can utilize body version 103B to perform a message related operation, such as, for example, replying to message 102, forwarding body version 103B, and/or viewing body version 103B. It may be that reply message 123 is a reply to message 102 and accordingly includes other message related data, for example, body 124. Body 124 can be in a higher fidelity format supported by messaging application 184. Alternately, a reply message simply including body 103B can be forwarded from computer system 101 to another computer system.

Figure 3:
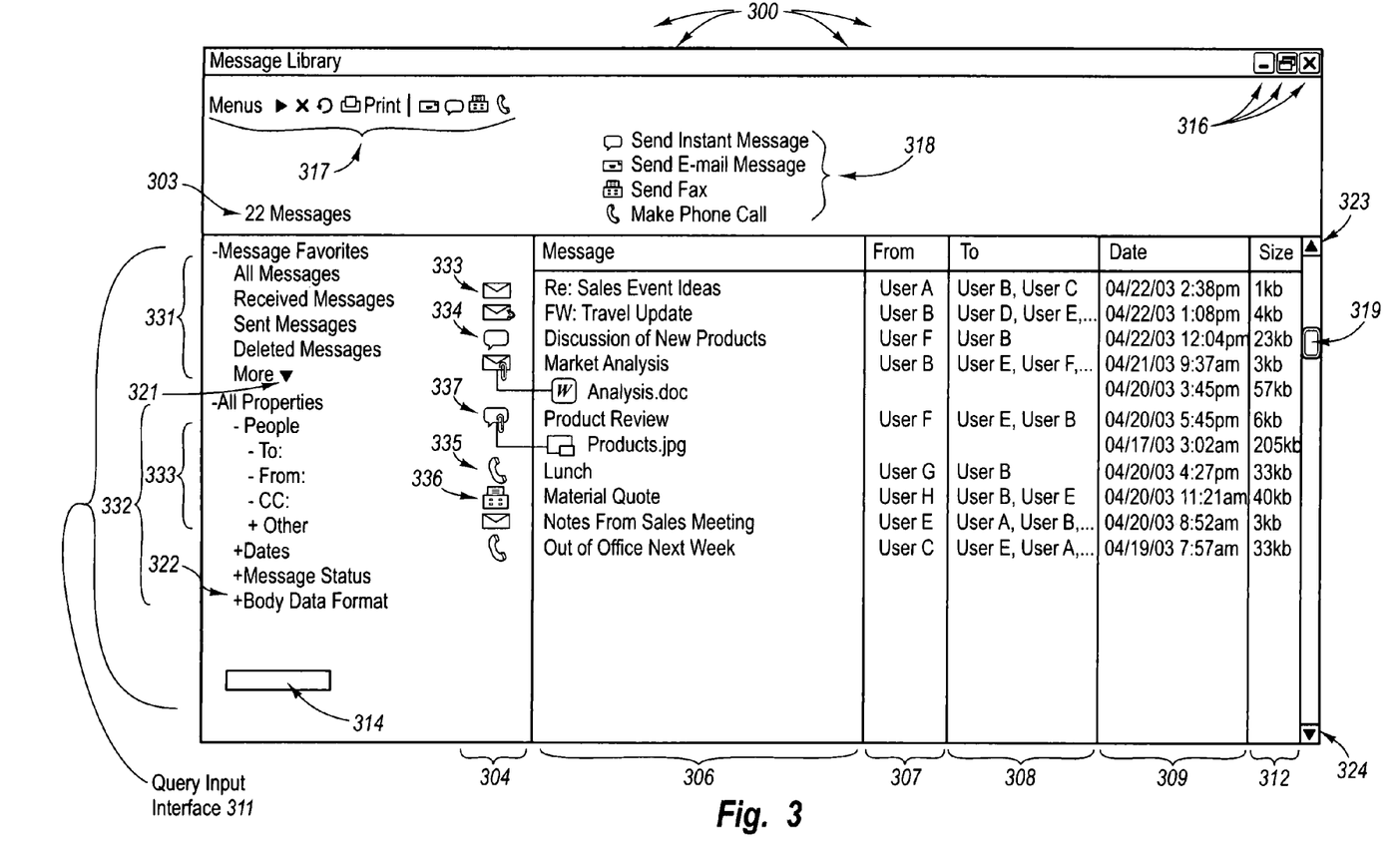
FIG. 3 illustrates an example display generated by a user interface.

In some embodiments, user interface 141 is utilized to interact with operating system 108, messaging application 104, and messaging application 184. User interface 141 can provide a common interface for a plurality of different messaging applications. FIG. 3 illustrates an example of a display 300 generated by a common messaging interface in accordance with the principles of the present invention.

Display 300 (e.g., a display generated by user-interface 141) depicts query input interface 311 that can receive query criteria used to query for message related data. Query input interface 311 can receive query criteria related to message items and body versions in store 111. A user can manipulate an input device (e.g., a mouse) to select one or more items in Message Favorites 331. Selecting an item in Message Favorites 331 can cause query input interface 311 to receive query criteria. For example, a user can select "Sent Messages" (e.g., by "clicking" on Sent Messages) to cause query input interface 311 to receive query criteria used to search for sent messages.

A user can manipulate an input device to select down arrow 321, which may reveal additional message favorites. These additional message favorites can be selected to cause query input interface 311 to receive other and/or additional query criteria. Query criteria received as a result of selecting items in Message Favorites 331 can be used to search for message related data values contained in message items. For example, received query criteria can be used to search for message items have data fields defined in accordance with message schema 150 and/or stored in store 111.

Query input interface 311 can also receive query criteria related to All Properties 332, such as, for example, related to message participants, message dates, message status, body data format, etc. A user can manipulate an input device to select one or more items corresponding to All Properties 332. For example, a user can select "Body Data Format" to cause query input interface 311 to receive query criteria used to search for message related data in body versions having a specified message body data format (e.g., plain text or HTML).

All Properties 332 may be arranged as a hierarchical tree of properties. A user can manipulate an input device to reveal or hide lower level properties. It may be that a user selects a "+" associated with a higher level property to reveal corresponding lower level properties. For example, a user can select + 322 to reveal lower level selectable Body Data Format properties (e.g., different types of data formats). On the other hand, a user may select a "−" associated with a higher level property to hide corresponding lower level properties. Lower level properties 333 are an example of the results of selecting a + associated with the People property. As depicted, the lower level properties, "To", "From", "CC", etc., are revealed. Lower level properties depicted in lower level properties 333 can include additional lower level properties.

A user can manipulate an input device to select properties of different levels from All Properties 332. Properties can be selected to cause query input interface 311 to receive other and/or additional query criteria. Query criteria received as a result of selecting items in All Properties 311 can be used to search for message related data values contained in message items. For example, received query criteria can be used to search for message items have data fields defined in accordance with message schema 150 and/or stored in store 111.

Input field 314 can receive query criteria for querying for keywords included in messages. A user can manipulate an input device (e.g., a keyboard) to enter text into input field 314. Query criteria received as a result of entering text into input field 314 can be used to search for message related data values contained in message items and body versions. For example, received query criteria can be used to search message items and body versions in store 111.

It should be understood that combined query criteria, including query criteria associated with Message Favorites 331 and/or query criteria associated with All Properties 332 (e.g., body data formats) and/or query criteria entered at input field 314, can be received. Combined query criteria can result when a plurality of items is selected from Message Favorites 331 or All Properties 332. Combined query criteria can also result when one or more items from Message Favorites 331 are combined with one or more items from All Properties 332. Further, combined query criteria can results when one or more items from Message Favorites 331 or one or more items from All Properties 332 are combined with text entered at input field 314.

Thus, query criteria can be more coarse resulting in broader queries and more results. For example, query criteria indicating all Sent Messages (entered by selecting "Sent Messages" from Message Favorites 331) in plain text format may result in an increased number of results. On the other hand, query criteria can be more granular resulting in narrower queries and fewer results. For example, a query criteria indicating all received messages in RTF format that were received on Apr. 20, 2003 including the keyword "fireworks" (entered at input field 314) may result in fewer results. Accordingly, query criteria can be flexibly received to meet the needs of a user.

Query input interface 311 expressly depicts controls for receiving some of the different types of query criteria that can be used to search for message related data. However, it should be understood that a query input interface can receive query criteria (including other types of query criteria in addition to those that can be received at query input interface 311) for searching for virtually any value from any message item data field, including searching for values from message item data fields defined in accordance with a message schema. For example, a query input interface can receive query criteria for searching values of any message item data fields defined (e.g., a participants field, subject field, etc.) in accordance with message schema 150.

Display 300 depicts an example of displaying links to portions of message related data. Depicted in display 300 are message type column 304, subject column 306, column 307, to column 308, date column 309, and size column 312. Message type column 304 displays an indication of a type of message related data. Different icons can be displayed to represent different types of message related data. For example, envelope icon 333 can represent electronic mail messages, text bubble icon 334 can represent instant messages, telephone icon 335 can represent voice mail messages, and fax machine icon 336 can represent fax messages. Other types of icons can also be displayed to represent other types of messages, such as, for example, news group postings, blog entries, etc.

A paperclip icon attached to an icon representing a message indicates that an attachment is associated with the represented message. For example, text bubble icon and attached paperclip icon 337 represent an instant message that is associated with attachment.

A user can select an icon representing an electronic message to view the content of the electronic message. For example, a user can select envelope icon 333 to view the contents of the represented electronic mail message. Thus, envelope icon 333 essentially functions as a link to the contents (e.g., a body version) of the represented electronic mail message. Selecting envelope icon 333 can cause an additional query (for the contents of the electronic message represented by envelope icon 333) to be submitted to store 111. Portions of message related data received in response the additional query can be displayed at display 300. Alternately, an appropriate messaging application can be initiated in response to a received portion of message related data. For example, when a portion of message related data is defined in accordance with a schema extension (e.g., an e-mail application schema), an application corresponding to the schema extension (e.g., an e-mail application) can be initiated to view the portion of message related data.

Subject column 306 indicates the subject of message related data corresponding to an icon in message type column 304. From column 307 indicates an entity that sent the message related data corresponding to an icon in message type column 304. To column 308 represents the recipients of the message related data corresponding to an icon in message type column 304. Date column 309 represents the date the message related content corresponding to an icon in message type column 304 was sent. Size column 312 represents the size of the message related content corresponding to an icon in message type column 304.

It may be that all received portions message related content cannot be displayed simultaneously. A user can manipulate slider control 319 to scroll up and/or down to reveal additional portions of message related content. A user can also select up arrow 323 to scroll up and down arrow 324 to scroll down. Boxes from among boxes 316 can be selected to minimize, maximize, re-size, or close display 300. Message indicator 303 indicates the number or portions of message related data received in response to query.

Message menu 317 indicates message operations that can be initiated through display 300. For example, a user can close, forward, or print currently selected electronic message. A user can also select an appropriate icon from message menu 317 to initiate an electronic mail message, an instant message, a fax message, or a phone call. Message list 318 indicates message types that can be used to respond to a displayed message. A user can select an appropriate icon to respond to a displayed message with a specified type of message. For example, a user could select the electronic mail message icon from message list 318 to respond to an instant message (e.g., represented by text bubble 334) with an electronic mail message. Accordingly, in response to selection of the electronic mail message icon, operating system 108 can access an appropriate body version corresponding to the instant message and provide the appropriate body version to the electronic mail application.

Embodiments of the present invention promote exchange of message bodies between different messaging applications. Exchanging message bodies facilitates flexible communication using a plurality of different messaging applications. A user interface provides users with efficient access to body versions in different body version data formats. Access to differently formatted body versions allows users to respond to one type of electronic message with another different type of electronic message.

Figure 4:
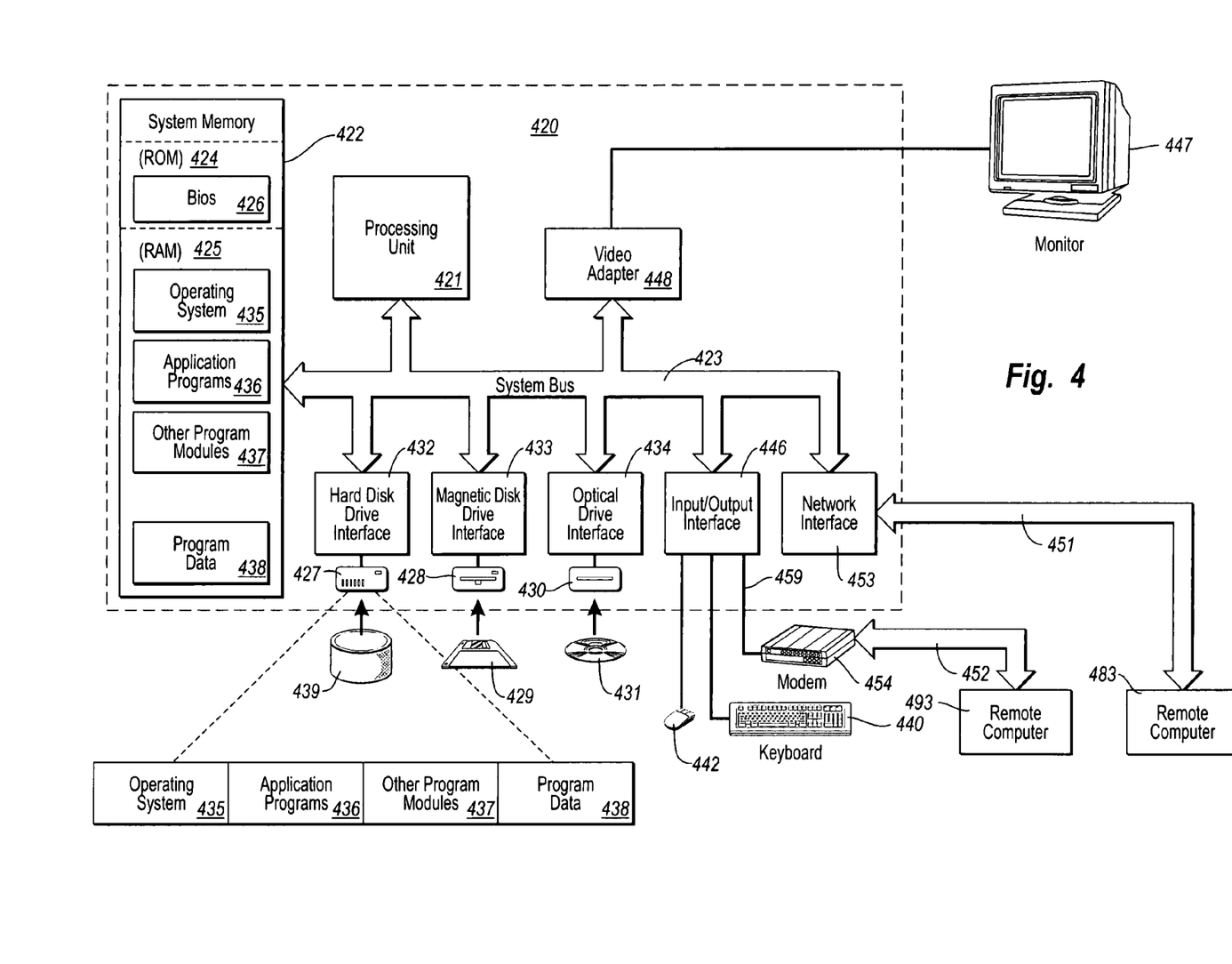
FIG. 4 illustrates a suitable operating environment for the principles of the present invention.

FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide non-volatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Speakers 469 or other audio output device is also connected to system bus 423 via audio interface 449. Other peripheral output devices (not shown), such as, for example, printers, can also be connected to computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem) via link 459, through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, message applications, operating systems, and user interfaces as well as associated data, including schemas, message items, and body versions may be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for use at a computer system that includes first and second messaging applications and is network connectable along with one or more other computer systems to a network, the method for providing access to an electronic message body, the method comprising:

receiving an electronic message, including a higher fidelity version of a message body, from a first messaging application, the higher fidelity version of the message body received in a higher fidelity data format, the higher fidelity data format being proprietary to the first messaging application and one of a plurality of different data formats the first messaging application supports, each data format in the plurality of different data formats varying in fidelity such that some data formats have more features than other data formats, the data formats including: plain text, HTML, and Rich Text;

interoperating with the first messaging application to cause the first messaging application to generate one or more additional versions of the message body, each additional version of the message body being in a different data format from among the plurality of different data formats the first messaging application supports, the one or more additional versions of the message body including a lower fidelity version of the message body formatted in accordance with the lower fidelity data format, the lower fidelity format having fewer features than the higher fidelity format, the lower fidelity version being one of an HTML version and a plain text version of the message body;

storing the electronic message and each of the differently formatted versions of the message body in a data store accessible to the first and second messaging applications;

maintaining an association between the electronic message and each of the differently formatted versions of the message body within the data store, includes maintaining an association between the electronic message and each of a) the higher fidelity format version of the message body, b) a middle fidelity format HTML version of the message body, and c) a lower fidelity format plain text version of the message body, the middle fidelity format having fewer features than the higher fidelity format and the lower fidelity format having fewer features than the middle fidelity format;

receiving a request for the electronic message from the second messaging application;

determining that the second messaging application and the first messaging application commonly support at least one of the plurality of different data formats selected from among: plain text, HTML, and Rich Text;

identifying the highest fidelity format that is commonly supported by both the first messaging application and the second messaging application; and providing a version of the message body, formatted in accordance with the highest fidelity format that is commonly supported from the data store to the second messaging application.

2. The method as recited in claim 1, wherein maintaining an association between an electronic message and each of the plurality of versions of a message body comprises linking a message item to each of the plurality of versions of the message body.

3. The method as recited in claim 1, wherein receiving a request for the electronic message from the second messaging application comprises the second messaging application requesting to reply to the electronic message.

4. The method as recited in claim 1, wherein determining that the second messaging application and the first messaging application commonly support at least one of the plurality of different data formats comprises determining that the second messaging application and the first messaging application commonly support at least one of HTML format and plaint text format.

5. The method as recited in claim 1, wherein the electronic message is selected from among the following types of electronic messages: an electronic mail message, an instant message, a blog entry, a news group posting, a fax message, an SMS message, a saved instant message log, a saved recording of telephone conversation, and a saved recording of a video conference.

6. The method as recited in claim 4, further comprising: determining that none of the stored versions of the message body are formatted in accordance with the preferred message format of the second messaging application prior to identifying the highest fidelity format that is commonly supported.

7. The method as recited in claim 5, wherein the first messaging application is an electronic mail messaging application, the second messaging application is an instant messaging application, and wherein the act of identifying the highest fidelity format that is commonly supported comprises an act of identifying plain text format.

8. The method as recited in claim 7, wherein providing a version of the message body comprises providing the plain text version of the message body to the instant messaging application such that the instant messaging application can be used to respond to an electronic mail message.

9. The method as recited in claim 1, wherein the higher fidelity data format is a data format selected from among RTF, TIFF-F, XML, and SMS, wherein a middle fidelity format is HTML, and wherein the lower fidelity format is plaint text.

10. The method as recited in claim 1, wherein the higher fidelity data format is a data format selected from among RTF, TIFF-F, XML, HTML, and SMS.

11. The method as recited in claim 1, wherein the lower fidelity data format is a data format selected from among HTML and plain text.

12. A computer program product for use in a computer system that includes first and second messaging applications and is network connectable along with one or more other computer systems to a network, the computer program product for implementing a method for providing access to an electronic message body, the computer program product comprising one or more computer storage media having stored thereon computer-executable instructions that, when executed by a processor, cause the computer system to perform the following:

receive an electronic message, including a higher fidelity version of a message body, from a first messaging application, the higher fidelity version of the message body received in a higher fidelity data format, the higher fidelity data format being proprietary to the first messaging application and one of a plurality of different data formats the first messaging application supports, each data format in the plurality of different data formats varying in fidelity such that some data formats have more features than other data formats, the data formats including: plain text, HTML, and Rich Text;

interoperate with the first messaging application to cause the first messaging application to generate one or more additional versions of the message body, each additional version of the message body being in a different data format from among the plurality of different data formats the first messaging application supports, the one or more additional versions of the message body including a lower fidelity version of the message body formatted in accordance with the lower fidelity data format, the lower fidelity format having fewer features than the higher fidelity format, the lower fidelity version being one of an HTML version and a plain text version of the message body;

store the electronic message and the differently formatted versions of the message body in a data store accessible to the first and second messaging applications;

maintain an association between the electronic message and each of the differently formatted versions of the message body within the data store, includes maintaining an associated between the electronic message and each of a) the higher fidelity format version of the message body, b) a middle fidelity format HTML version of the message body, and c) a lower fidelity format plain text version of the message body, the middle fidelity format having fewer features than the higher fidelity format and the lower fidelity format having fewer features than the middle fidelity format;

receive a request for access to the electronic message from the second messaging application;

determine that the second messaging application and the first messaging application commonly support at least one of the plurality of different data formats selected from among: plain text, HTML, and Rich Text;

identifying the highest fidelity format that is commonly supported by both the first messaging application and the second messaging application; and provide a version of the message body, formatted in accordance with the highest fidelity format that is commonly supported from the data store to the second messaging application.

13. The method as recited in claim 1, wherein receiving an electronic message, including a higher fidelity version of a message body, from a first messaging application, the higher fidelity version of message body received in a first data format comprises receiving an electronic message, including a plurality of versions of a message body, each version of the message body in a data format the first messaging application supports respectively; and wherein interoperating with the first messaging application to cause the first messaging application to generate one or more additional versions of the message body comprises interoperating with the first messaging application to cause the first messaging application to generate one or more additional versions of the message body in other data formats the first message application supports, the one or more additional versions of the message body in data formats not included in the received electronic message.

14. The computer program product as recited in claim 12, wherein computer-executable instructions that, when executed by a processor, cause the computer system to maintain an association between an electronic message and each of the plurality of versions of a message body comprise computer-executable instructions that, when executed by a processor, cause the computer system to link a message item to each of the plurality of versions of the message body.

15. The computer program product as recited in claim 12, wherein computer-executable instructions that, when executed by a processor, cause the computer system to receive a request for the electronic message from the second messaging application comprise computer-executable instructions that, when executed by a processor, cause the second messaging application to reply to the electronic message.

16. The computer program product as recited in claim 12, wherein computer-executable instructions that, when executed by a processor, cause the computer system to determine that the second messaging application and the first messaging application commonly support at least one of the plurality of different data formats comprise computer-executable instructions that, when executed by a processor, cause the computer system to determine that the second messaging application and the first messaging application commonly support at least one of HTML format and plaint text format.

17. The computer program product as recited in claim 16, further comprising computer-executable instructions that, when executed by a processor, cause the computer system to determine that none of the stored versions of the message body are formatted in accordance with the preferred message format of the second messaging application prior to identifying the highest fidelity format that is commonly supported.

18. The computer program product as recited in claim 12, wherein the electronic message is selected from among the following types of electronic messages: an electronic mail message, an instant message, a blog entry, a news group posting, a fax message, an SMS message, a saved instant message log, a saved recording of telephone conversation, and a saved recording of a video conference.

19. The computer program product as recited in claim 18, wherein the first messaging application is an electronic mail messaging application, the second messaging application is an instant messaging application, and wherein the act of identifying the highest fidelity format that is commonly supported comprises an act of identifying plain text format.

20. The computer program product as recited in claim 18, wherein computer-executable instructions that, when executed by a processor, cause the computer system to provide a version of the message body comprises providing the plain text version of the message body to the instant messaging application such that the instant messaging application can be used to respond to an electronic mail message.

21. The computer program product as recited in claim 12, wherein the higher fidelity data format is a data format selected from among RTF, TIFF-F, XML, and SMS, wherein a middle fidelity format is HTML, and wherein the lower fidelity format is plaint text.

22. The computer program product as recited in claim 12, wherein the higher fidelity data format is a data format selected from among RTF, TIFF-F, XML, HTML, and SMS.

23. The computer program product as recited in claim 12, wherein the lower fidelity data format is a data format selected from among HTML and plain text.

24. A computer system, the computer system comprising:
system memory;
one or more processors; and
one or more computer storage media having stored thereon computer-executable instructions representing an operating system, the operating system including a format support detector, the format support detector configured to:

receive an electronic message, including a higher fidelity version of a message body, from a first messaging application, the higher fidelity version of the message body received in a higher fidelity data format, the higher fidelity data format being proprietary to the first messaging application and one of a plurality of different data formats the first messaging application supports, each data format in the plurality of different data formats varying in fidelity such that some data formats have more features than other data formats, the data formats including: plain text, HTML, and Rich Text;

interoperate with the first messaging application to cause the first messaging application to generate one or more additional versions of the message body, each additional version of the message body being in a different data format from among the plurality of different data formats the first messaging application supports, the one or more additional versions of the message body including a lower fidelity version of the message body formatted in accordance with the lower fidelity data format, the lower fidelity format having fewer features than the higher fidelity format, the lower fidelity version being one of an HTML version and a plain text version of the message body;

store the electronic message and the differently formatted versions of the message body in a data store accessible to the first and second messaging applications;

maintain an association between the electronic message and each of the differently formatted versions of the message body within the data store, includes maintaining an associated between the electronic message and each of a) the higher fidelity format version of the message body, b) a middle fidelity format HTML version of the message body, and c) a lower fidelity format plain text version of the message body, the middle fidelity format having fewer features than the higher fidelity format and the lower fidelity format having fewer features than the middle fidelity format;

receive a request for access to the electronic message from the second messaging application;

determine that the second messaging application and the first messaging application commonly support at least one of the plurality of different data formats selected from among: plain text, HTML, and Rich Text;

identifying the highest fidelity format that is commonly supported by both the first messaging application and the second messaging application; and provide a version of the message body, formatted in accordance with the highest fidelity format that is commonly supported, from the data store to the second messaging application.

* * * * *